Nov. 28, 1967  W. KÜHNLE ETAL  3,354,744
SHIFTING DEVICE FOR MOTOR VEHICLE TRANSMISSIONS
Filed July 28, 1965

Fig. 2

United States Patent Office 3,354,744
Patented Nov. 28, 1967

3,354,744
SHIFTING DEVICE FOR MOTOR VEHICLE TRANSMISSIONS
Willi Kühnle and Walter Frei, Friedrichshafen, Germany, assignors to Zahnradfabrik Friedrichshafen, Aktiengesellschaft, Friedrichshafen, Germany
Filed July 28, 1965, Ser. No. 475,462
Claims priority, application Germany, Aug. 1, 1964, Z 11,002
8 Claims. (Cl. 74—645)

ABSTRACT OF THE DISCLOSURE

The invention provides a multi-ratio transmission having a plurality of drive ratio devices and a control system for effecting automatic control of the devices which comprises electrical circuitry in which a signal voltage varies in response to vehicle speed.

---

This invention relates to an electronic shifting system for the automatic shifting of a gear transmission, especially for motor vehicles, which is responsive to vehicle speed or to vehicle speed acceleration pedal position jointly.

Previous systems for producing drive ratio control signals for automatic shifting purposes have included a transistor control circuit and switching network. The control circuit in such systems have been supplied with control voltage proportional to the vehicle speed utilizing a zener diode. An adjustable resistance is connected in common with the control circuit and the switching network, in order to vary the difference between the points of shifting up and shifting down. A variable transformer is generally connected between the control current source and the control circuit. A change in the voltage ratio of the transformer is responsive to changes in the position of the throttle valve. Thus, the control voltage is also dependent on the position of the throttle valve.

In the aforementioned type of system the adjustable resistance will change the voltage and current ratios in both the control circuit and the switching network. This system has the disadvantage that in changing the relationship between the upward and downward shifting points the position of the upward shifting point will not remain stable. In addition, in systems of this type, special adaptation of the electrical switch elements must be made for various transmission and vehicle types.

Furthermore, the control circuit of this type of system is fed alternating current. Since the transistor only allows the negative half wave to pass through, the switching relay receives a pulsating direct current which will not guarantee a faultless attraction of the relay. In addition, the unloaded positive half wave can endanger the transistor by exceeding the voltage of the closing current flowing across the base-emitter section.

Another disadvantage of this type of system is that the transistors are not protected against destruction by interference voltages below the breakdown voltage of the zener diode through the base-bleeder resistor and the capacitor-relay circuit.

An important object of this invention is to provide a shifting system for the automatic shifting of gear transmission whose shifting points for the changing of gears are infinitely adjustable to accommodate any driving conditions.

Another object of this invention is to provide a ratio shifting device whereby the required differential between the points for shifting up and shifting down may be fixed or varied in response to driving conditions.

Another object is to provide a shifting device wherein the shifting points may be infinitely varied in accordance with the position of the accelerator actuated throttle valve or engine load.

Another object of the invention is to provide a shifting device wherein the basic upward shift points in relation to one another will not be influenced by other adjustments.

A further object is to provide a shifting device for a combined hydrodynamic and gear transmission with electromagnetically controlled ratio control valves, utilizing self-induced current during shifting to disengage a bypass coupling of the hydrodynamic torque converter or fluid flywheel.

A still further object of the invention is to provide a circuit wherein the by-pass coupling of the torque converter can be operated in accordance with vehicle speed.

In accordance with the foregoing, a switching network with a relay is connected to the converter coupling. This switching network is responsive to the vehicle speed through a section of the control circuit associated with the proper gear shift step. Consequently, the operational timing for the converter coupling will be controlled along with the adjustment of the shifting point regulators for the individual speeds.

Additional objects are to protect the shifting circuits from spurious voltages, to remove the need for sensitive control lines which are usually placed throughout the vehicle and which endanger transistors because of ground leakage or induction; also to stabilize the switching system against temperature changes.

The foregoing, as well as other objects, will be made more apparent as this description proceeds, particularly when considered in connection with the accompanying drawing, in which:

FIG. 2 is an electrical circuit diagram of one form of switching system for a four-gear transmission;

Figure 1:
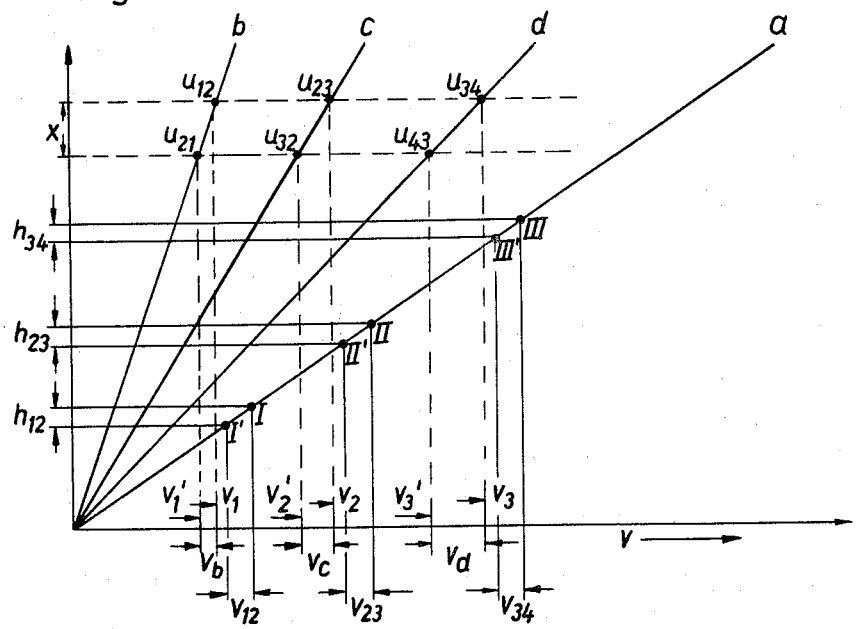
FIG. 1 is a graph showing various transformer characteristics associated with the systems of the present invention.

Referring to the graph of FIG. 1, the abscissa and ordinate represent the primary and secondary voltages, respectively, of speed signal transformers of the type to be used to supply voltages for the control circuits of the shifting system. The primary voltage is supplied by a generator driven in response to vehicle speed so as to provide the vehicle speed signal.

Line $a$ represents the characteristic of a transformer having one secondary winding in one form of system. The transformer is so designed that the slope of the characteristic line $a$ is low in order to maintain secondary voltages within a selected small range while allowing the primary voltages to cover a wide range of speed. It is assumed that the characteristics of the transformer will be linear.

On characteristic line $a$ the points for shifting upward have been fixed at I, II, and III. The points for shifting downward are at I′, II′, and III′. When using this type of transformer if the difference in the speed of travel between the respective up-shifting and down-shifting points for the various shifting steps are equal, then the differences between the secondary voltage values will also be equal; that is to say, when the horizontal projections $v_{12}$, $v_{23}$, and $v_{34}$ of sections I′–I, II′–II, and III′–III are equal to one another, the respective differences $h_{12}$, $h_{23}$, and $h_{34}$ in the secondary voltages are also equal. The secondary voltages are, of course, different for each shifting step.

In another form of control system the control voltages triggering each gear change is the same regardless of variations in the speed of travel. In this arrangement the speed signal transformer has three secondary windings associated with separate sections of the control circuit to be hereafter described, each secondary characteristic having been specifically designed for a different shift step. In FIG. 1, lines $b$, $c$, and $d$ represent the characteristics of the secondaries of the transformer so designed. In this case, because of the various slopes of lines $b$, $c$, and $d$, there will be variations of the difference $v_b$, $v_c$, and $v_d$ between the respective up-shifting and down-shifting speeds at an equal difference $x$ in the secondary voltages.

Figure 2:
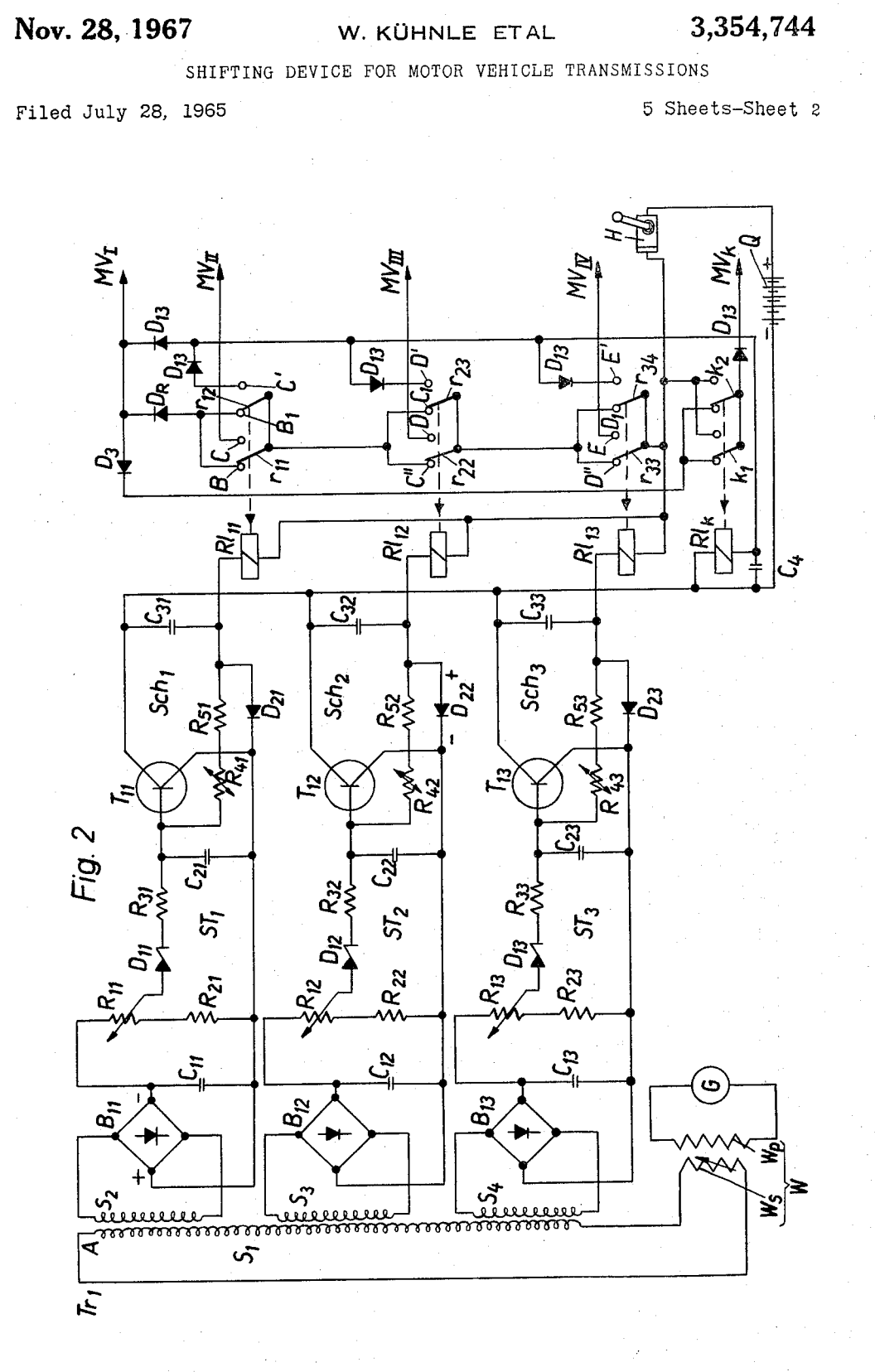

In the system depicted in FIG. 2 a vehicle driven generator G supplies AC voltage, the value of which at any time is in direct relationship to the vehicle speed. This AC voltage is fed through variable ratio transformer W.

The variable transformer W has its primary winding $N_p$ and secondary winding $W_s$ which are concentric to one another and arranged on a single rotational axis whereby the secondary $W_s$ is rotatable inside the primary coil $W_p$. The primary $W_p$ is connected to the generator G while the secondary $W_s$ is connected to the primary winding $S_1$ of transformer $Tr_1$.

The shifting system may be influenced by various factors other than vehicle speed through adjustment of the variable transformer. For example, it may be influenced in response to engine control. The rotational axis of variable transformer W would then be adjusted by the gas pedal. If it is to be regulated in accordance with the motor load, the axis is adjusted by the regulator of the injection pump or by the vacuum in the intake manifold. The variable transformer is designed to increase the control voltage during a decrease of the gas pedal or when the motor load declines, or, on the other hand, to decrease the control voltage with an increase of the gas pedal setting or at an increase of the motor load.

The transformer $Tr_1$ transfers the vehicle speed signal to the secondaries thereof and has the advantage of isolating the control circuits of the shifting system against earth leakage or other spurious currents.

The voltages induced in the secondary windings $S_2$, $S_3$, and $S_4$ are connected into DC control voltages via the respective rectifiers $B_{11}$, $B_{12}$ and $B_{13}$. The secondary windings are so graduated that they will supply control current proportional to the vehicle speed having characteristics indicated by lines $b$, $c$, and $d$, in FIG. 1. Secondary $S_2$ has a characteristic denoted by line $b$. $S_3$ has a characteristic denoted by line $c$, and $S_4$ has a characteristic denoted by line $d$. This shifting system has the advantage that the separate control circuit section $ST_1$, $ST_2$ and $ST_3$ and switching networks $Sch_1$, $Sch_2$ and $Sch_3$ may contain the same elements and that the speed shifts are triggered each time by the same control voltage value.

In other words, as the vehicle accelerates the control voltage $u_{12}$ (FIG. 1) obtained from the rectifier $B_{11}$ (FIG. 2) will reach the breakdown value for the zener diode $D_{11}$ at a vehicle speed corresponding to voltage $v_1$ while the control voltage $u_{23}$ obtained from rectifier $B_{12}$ will reach the breakdown value of zener diode $D_{12}$ at the vehicle speed corresponding to voltage $v_2$ and control voltage $u_{34}$ obtained from the rectifier $B_{13}$ will reach a breakdown value corresponding to the voltage $v_3$. Consequently, the respective components in each control circuit section and switching network are the same.

Each of the control circuit sections $ST_1$, $ST_2$ and $ST_3$ is connected to the respective rectifiers $B_{11}$, $B_{12}$ and $B_{13}$ via voltage dividers $R_{11}$–$R_{21}$, $R_{12}$–$R_{22}$ and $R_{13}$–$R_{23}$. Filtering capacitors $C_{11}$, $C_{12}$ and $C_{13}$ are connected in series with the respective voltage dividers in a conventional manner. The variable resistances $R_{11}$, $R_{12}$ and $R_{13}$ constitute shift point regulators for setting the upward shifting point in each shifting step in order to adapt the shifting point to the required conditions of travel. The taps of the shifting point regulators $R_{11}$, $R_{12}$ and $R_{13}$ are connected to the bases of PNP types of switching transistors $T_{11}$, $T_{12}$ and $T_{13}$ via respective zener diodes $D_{11}$, $D_{12}$ and $D_{13}$. The emitter circuits of the transistors are connected to the positive poles of the respective rectifiers.

Figure 6:
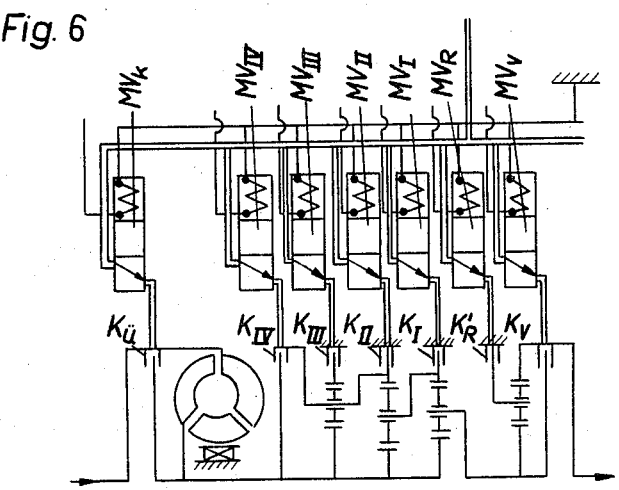
FIG. 6 shows a schematic diagram of a hydrodynamic multi-speed gear transmission controlled by the systems of the present invention.

The shifting current which activates the various solenoids $MV_I$, $MV_{II}$, $MV_{III}$, $MV_{IV}$ and $MV_k$ (shown in FIG. 6) is supplied by the battery Q. The positive terminal of the battery Q is connected to the emitters of the respective transistors $T_{11}$, $T_{12}$ and $T_{13}$ via the respective coils of relays $Rl_{11}$, $Rl_{12}$ and $Rl_{13}$ and the respective diodes $D_{21}$, $D_{22}$ and $D_{23}$. The negative terminal of battery Q is connected to the collectors of the transistors $T_{11}$, $T_{12}$ and $T_{13}$. The switching relays $Rl_{11}$, $Rl_{12}$ and $Rl_{13}$ are also connected to the base of the respective transistors $T_{11}$, $T_{12}$ and $T_{13}$ through the respective thermistors $R_{41}$, $R_{42}$ and $R_{43}$ and the fixed resistances $R_{51}$, $R_{52}$ and $R_{53}$. Capacitors $C_{31}$, $C_{32}$ and $C_{33}$ are connected in parallel to the collector-emitter circuit of the respective switching networks.

Thermistors $R_{41}$, $R_{42}$ and $R_{43}$ serve to compensate for temperature changes on the switching system. Capacitors $C_{31}$, $C_{32}$ and $C_{33}$ serve for the purpose of spark quenching in the relays $Rl_{11}$, $Rl_{12}$ and $Rl_{13}$ and for blocking spurious voltage peaks.

The transistors $T_{11}$, $T_{12}$ and $T_{13}$ are of the PNP type so that the resistances $R_{51}$, $R_{52}$ and $R_{53}$ will establish a current path through diodes $D_{21}$, $D_{22}$ and $D_{23}$ when the bases are negatively biased. This arrangement protects the transistor in the non-conductive state when cut-off voltage is applied to the bases.

First gear is engaged by shifting the gear shift lever H from the neutral position to the "automatic shift" position. By adjustment of the gas pedal (not shown) the vehicle is put into motion and accelerated in the usual manner.

When the vehicle is accelerated, generator G supplies an AC voltage in proportion to the rate of travel. This voltage is transferred to the primary $W_p$ of variable transformer W. The output voltage from the secondary $W_s$ is dependent on the input from the generator and the inductance of the transformer which is jointly controlled by the gas pedal or motor load. Thus, the AC voltage is inversely proportional to the gas pedal setting or load on the engine and, at the same time, proportional to the rate of speed of the vehicle.

The AC voltage put out by the variable transformer W is directed to the primary winding $S_1$ of transformer $Tr_1$. The AC voltages at the output of the secondary windings $S_2$, $S_3$ and $S_4$ are fed to the respective rectifiers $B_{11}$, $B_{12}$ and $B_{13}$. The DC voltages at the negative terminals of these rectifiers are the control voltages for the respective control circuit sections $ST_1$, $ST_2$ and $ST_3$.

As the vehicle is accelerated in first gear, the control voltage put out by rectifier $B_{11}$ to the control section $ST_1$ will reach a value corresponding to the breakdown value of the zener diode $D_{11}$. The base-emitter section of transistor $T_{11}$ becomes conductive to complete the control circuit section $ST_1$. As a result, the switching network $Sch_1$ is closed via the collector-emitter circuit and relay $Rl_{11}$ is energized. The relay switches $r_{11}$ and $r_{12}$ of relay $Rl_{11}$ are switched from contacts B and $B_1$ to contacts C and C'. Thus, shifting current is transferred from solenoid valve $MV_I$ to solenoid valve $MV_{II}$.

A self-induced current caused by disconnecting solenoid valve $MV_I$ charges capacitor $C_4$ and excites relay $Rl_k$. Upon termination of the self-induced current, capacitor $C_4$ discharges so as to maintain the relay $Rl_k$ energized for a predetermined delay period. Thus, the shifting current from battery Q is directed to solenoid valve $MV_k$ to open by-pass coupling or torque converter lock up clutch $K_u$ during the change of gears when relay $Rl_k$ is maintained energized. The duration of the delay period can be set by proper design of the relay $Rl_k$ and capacitor $C_4$.

Diodes $D_{13}$ provide spark quenching at the solenoid switch couplings and insure that the self-induced current, caused by disconnecting of the solenoid valves, will reach relay $Rl_k$.

Upon further increasing the speed of travel of the vehicle, the control voltage put out by rectifier $B_{12}$ reaches the breakdown value of zener diode $D_{12}$. This closes control circuit section $ST_2$. The base-emitter section of transistor $T_{12}$ starts conducting. This closes switching network $Sch_2$ and operates relay $Rl_{12}$, switching the shifting current from solenoid valve $MV_{II}$ to solenoid valve $MV_{III}$. The self-induced current developed by disconnecting solenoid valve $MV_{II}$ will again energize relay $R/_k$ and charge capacitor $C_4$ through the respective diode $D_{13}$. The relay $R/_k$ will therefore again operate solenoid valve $MV_k$ to open the by-pass coupling $K_u$ during the gear change-over, as described above.

Similarly, shifting from third to fourth gear takes place as soon as the control voltage across rectifier $B_{13}$ reaches the breakdown value of zener diode $D_{13}$.

During decrease in the speed of travel of the vehicle the AC voltage generated by generator G drops off. The voltages put out by rectifiers $B_{11}$, $B_{12}$ and $B_{13}$ in control circuit sections $ST_1$, $ST_2$ and $ST_3$ will drop off in the reverse sequence. As the control voltages drop, the control circuit sections are held closed by the respective zener diodes because the control voltage across the respective diodes $D_{21}$, $D_{22}$ and $D_{23}$ are lowered by the decrease of voltage and breakdown value of the respective zener diode. Because of this, the down-shifting point will be at a lower rate of travel $v_1'$, $v_2'$ and $v_3'$. This difference of control voltage or of travel speed between the up-shifting points and down-shifting points is determined by the values of zener diodes $D_{11}$, $D_{12}$ and $D_{13}$, resistances $R_{31}$, $R_{32}$ and $R_{33}$ and $R_{51}$, $R_{52}$ and $R_{53}$ and diodes $D_{21}$, $D_{22}$ and $D_{23}$.

Figure 3:
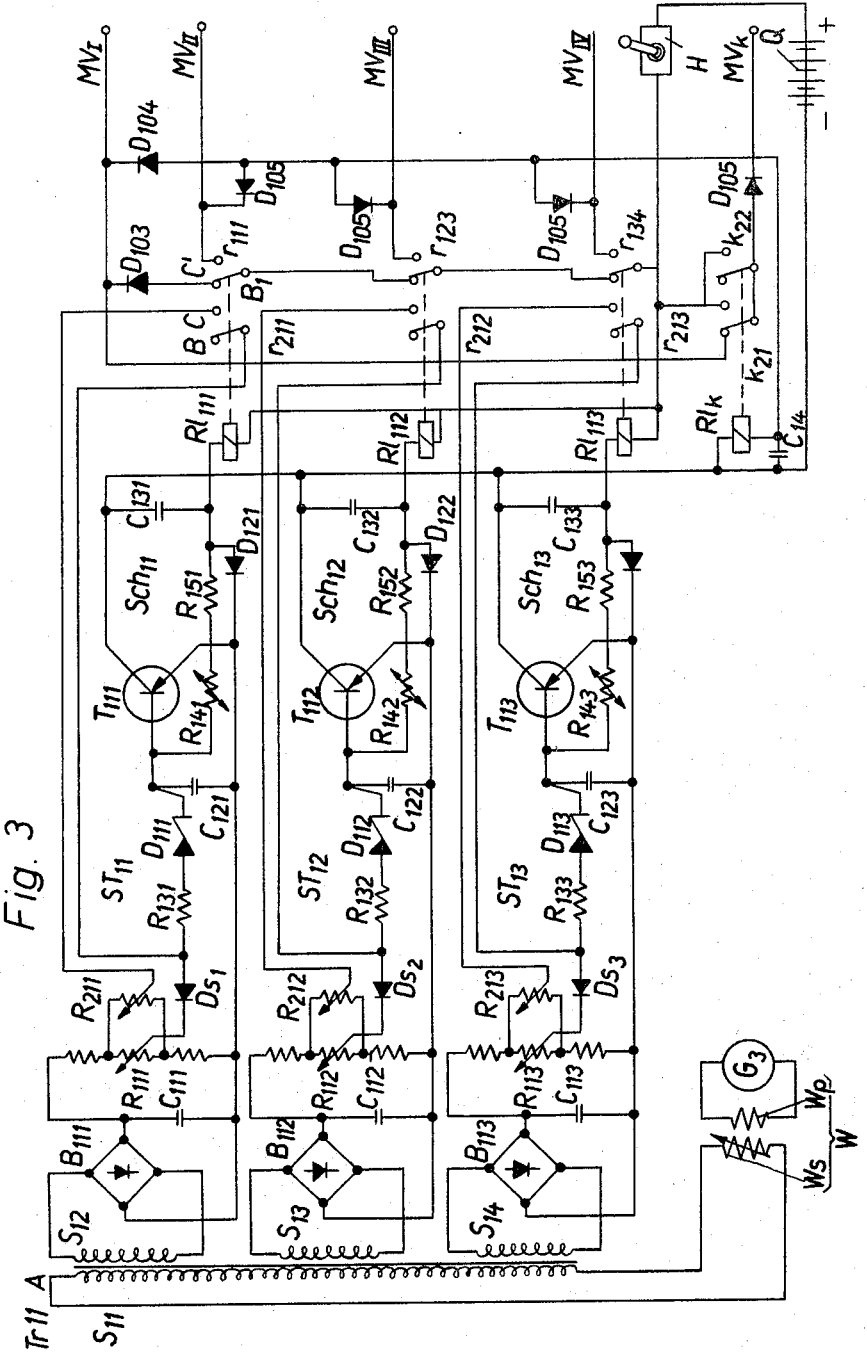
FIG. 3 is an electrical circuit diagram of a second form of switching device for a four-speed transmission.

The wiring of the shifting device, according to FIG. 3, is similar in principle with FIG. 2. However, the difference between the gear shifting points is additionally controlled in dependence on the gear step. To effect this, additional regulating resistances $R_{211}$, $R_{212}$ and $R_{213}$ are connected in parallel, to the respective primary regulating resistances $R_{111}$, $R_{112}$ and $R_{113}$.

In addition, relays $Rl_{111}$, $Rl_{112}$ and $Rl_{113}$ include switch contacts $r_{211}$, $r_{223}$ and $r_{234}$ which are connected to the tap of the respective resistances $R_{111}$, $R_{112}$ and $R_{113}$ through diodes $Ds_1$, $Ds_2$ and $Ds_3$. As each relay is operated the respective switching contacts $r_{211}$, $r_{212}$ and $r_{213}$ will connect the regulating resistances $R_{211}$, $R_{212}$ and $R_{213}$ into the respective control circuits $ST_{11}$, $ST_{12}$ and $ST_{13}$. In order to preclude any overlapping of the up-shifting and down-shifting points by adjustment of the regulating resistance the cut-off diodes $Ds_1$, $Ds_2$ and $Ds_3$ are connected between the respective regulating resistances $R_{111}$, $R_{112}$ and $R_{113}$ and resistances $R_{131}$, $R_{123}$ and $R_{133}$. Because of these cut-off diodes, the control voltages will only become effective via $R_{211}$, $R_{212}$ and $R_{213}$ whenever the resistance has been set smaller than at $R_{111}$, $R_{112}$ and $R_{113}$.

Figure 4:
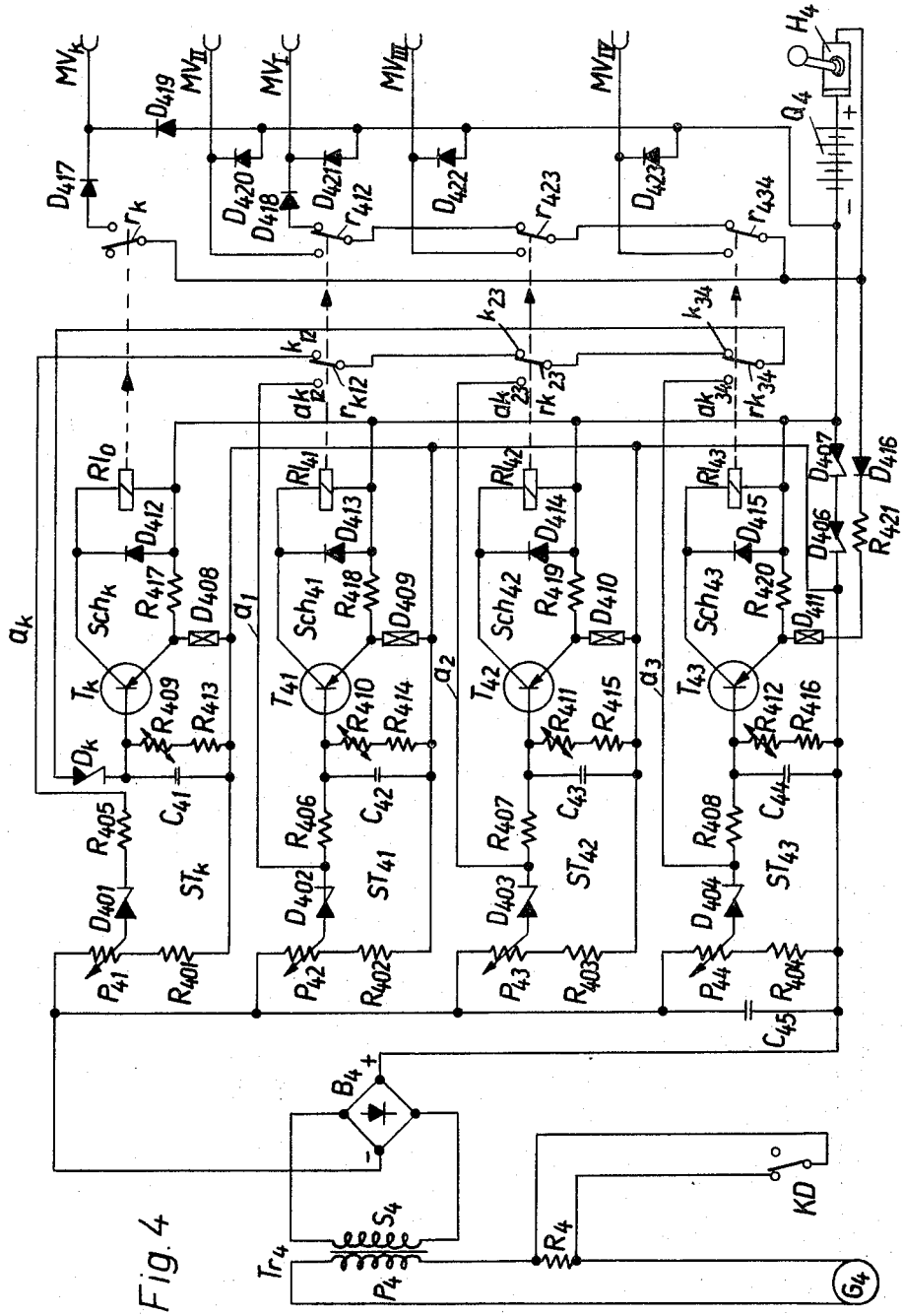
FIG. 4 is an electrical circuit diagram of a third form of switching system.

While the switching system, according to FIGS. 2 and 3, are equipped with a transformer having several secondary windings in order to achieve equal control voltages at the switch-over points for the individual control circuit sections, the switching system, according to FIG. 4, employs a transformer with only one secondary winding. Therefore, the control voltage developed dependent on the speed of travel will be the same in each of the control circuit sections at any given moment.

Generator $G_4$ driven in dependence on the speed of travel supplies an AC voltage to the primary $P_4$ of transformer $Tr_4$. The voltage developed at the secondary $S_4$ is fed through rectifier $B_4$, filter capacitor $C_{45}$ to control circuit sections $ST_k$ and $ST_{41}$, $ST_{42}$ and $ST_{43}$ which are arranged in parallel to one another.

Because transformer $Tr_4$ has only one secondary and supplies the same control voltage to each circuit, in order to effect switching of the various circuits at different rates of travel, it is necessary to design zener diodes $D_{401}$, $D_{402}$, $D_{403}$ and $D_{404}$ with different breakdown voltages. These are arranged in order so that zener diode $D_{401}$ has the lowest breakdown voltage and zener diode $D_{404}$ has the highest breakdown voltage.

The switching system, according to FIG. 4, makes use of a separate control circuit section $ST_k$ and switching network $Sch_k$ with relay $Rl_0$ to energize solenoid valve $MV_k$ and close by-pass coupling $K_u$ which is opened during shifting. Upon accelerating of the vehicle, the first diode to break down is zener diode $D_{401}$. The control voltage will then reach a second zener diode $D_k$ via resistor $R_{405}$, line $a_k'$ and relay contacts $rk_{12}$, $rk_{23}$ and $rk_{34}$. When the control voltage reaches the point where zener diode $D_k$ also breaks down, transistor $T_k$ closes the switching network $Sch_k$ whereupon relay $Rl_0$ switches the shifting current to solenoid valve $MV_k$ through contact $r_k$ to close the by-pass coupling.

Upon increasing the rate of travel to the point where the control voltage in the control circuit section $ST_{41}$ reaches the breakdown value of zener diode $D_{402}$, switching network $Sch_{41}$ is closed, causing relay $Rl_{41}$ to switch the shifting current from solenoid valve $MV_I$ to solenoid valve $MV_{II}$, by means of contact $r_{412}$.

At the same time, contact $rk_{12}$ is disconnected from contact $K_{12}$, interrupting the current in control circuit section $ST_k$. This momentary interruption opens switching network $Sch_k$ and disconnects solenoid valve $MV_k$ to open the by-pass coupling. At the end of the shift interval, wiper $rk_{12}$ makes contact with $ak_{12}$ and connects zener diode $D_k$ to zener diode $D_{402}$ via line $a_1$.

Upon completion of shifting, the breakdown voltage of zener diode $D_k$ is again reached. Switching network $Sch_k$ will again be closed and the entire cycle will be repeated to shift into the next higher gear.

In shifting down, zener diode $D_k$ will be the first to block due to the decreasing control voltage. When this happens, control circuit section $ST_k$ will be opened and switching network $Sch_k$, by means of relay $Rl_0$, will disconnect solenoid valve $MV_k$ from the switching current, causing the by-pass coupling of the torque converter to be opened. Then, after a further decrease in vehicle speed, the decreasing control voltage causes zener diode $D_{404}$ to block, which by means of control circuit section $ST_{43}$ and switching network $Sch_{43}$ shifts the gear transmission from fourth to third gear. At the same time, the switch $rk_{34}$ of relay $Rl_{43}$ disconnects zener diode $D_k$ from control circuit section $ST_{43}$ and connects it to control circuit section $ST_{42}$.

Depending upon the relationships of the breakdown value of zener diode $D_k$ and the breakdown values of zener diodes $D_{402}$, $D_{403}$ and $D_{404}$, if the vehicle is rapidly decelerated, zener diode $D_k$ will remain blocked, holding the by-pass coupling open. However, if the vehicle is decelerated gradually or decelerated to a lesser speed which is then maintained, the control voltage supplied to the lower shifting step will be sufficient to break down zener diode $D_k$ and close the by-pass coupling.

The difference between the control voltages at the up-shifting and down-shifting points are determined by the characteristics of zener diodes $D_{401}$, $D_{402}$, $D_{403}$, $D_{404}$ and $D_k$, as well as the values of resistances $R_{405}$, $R_{406}$, $R_{407}$, $R_{408}$, $R_{413}$, $R_{414}$, $R_{415}$ and $R_{416}$. When adjusting the gear shift points by varying shifting point regulators $P_{41}$, $P_{42}$, $P_{43}$ and $P_{44}$, the shifting point for the by-pass coupling $K_u$ of the torque converter is automatically adjusted correspondingly.

To effect positive cut-off voltage at the base of the transistors, diodes $D_{408}$, $D_{409}$ and $D_{410}$ and $D_{411}$ are connected between the respective emitters of the transistors and the positive voltage line of rectifier $B_4$, and resistances $R_{417}$, $R_{418}$, $R_{419}$ and $R_{420}$ are connected between the negative voltage line of the current source Q and the respective emitter. Resistances $R_{409}$–$R_{413}$; $R_{410}$–$R_{414}$; $R_{411}$–$R_{415}$; and $R_{412}$–$R_{416}$ transfer the positive cut-off voltage to the base.

Diodes $D_{412}$, $D_{413}$, $D_{414}$ and $D_{415}$ are connected in parallel to respective relays $Rl_0$, $Rl_{41}$, $Rl_{42}$ and $Rl_{43}$ in order to effect spark quenching across the relays. In addition, to stabilize the circuit against interference voltages, zener diodes $D_{406}$ and $D_{407}$ are connected in series in the switch current circuit. Diode $D_{416}$ and series resistance $R_{421}$ are connected between shift element $H_4$ and the positive voltage line of rectifier $B_4$ to prevent damage in case of inadvertent reversal of the battery terminals.

In order to control the path of the self-induced current produced when solenoid valves $MV_k$, $MV_I$, $MV_{II}$, $MV_{III}$ and $MV_{IV}$ are disconnected diodes $D_{419}$, $D_{420}$, $D_{421}$, $D_{422}$ and $D_{423}$ are connected in a blocking position between the respective solenoids and the negative battery terminal.

Further control of the switching system shown in FIG. 4 is effected by the switch KD and resistor $R_4$ connected between one terminal of generator $G_4$ and one terminal of the primary $P_4$ of transformer $Tr_4$. The switch KD is activated by the gas pedal in such a way that switch KD opens when the gas pedal is pushed down to fully open throttle position. This drops the generator current and lowers the control voltage. The result is a displacement of the shifting points to a higher range of speed, and may serve to delay shifting into the next higher gear.

Figure 5:
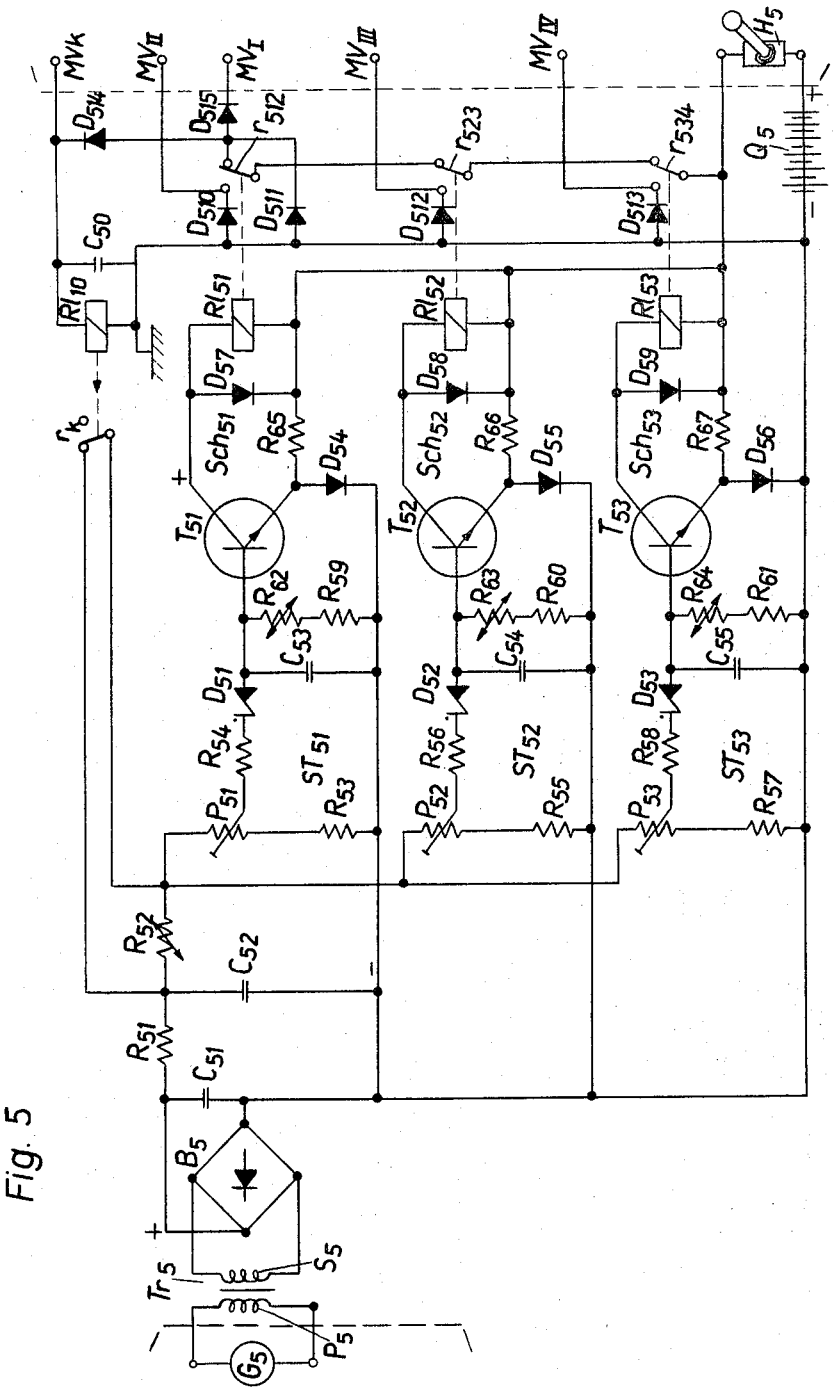
FIG. 5 is an electrical circuit diagram of a fourth form of switching system.

In the shifting system shown in FIG. 5 the solenoid $MV_k$ for by-pass coupling $K_u$ is controlled by relay $Rl_{10}$, capacitor $C_{50}$, relay switch $r_k$, and variable resistance $R_{52}$. In operation, gear shift $H_5$ closes the shifting circuit which energizes solenoid $MV_I$ putting the transmission into first gear.

At the same time, the shifting current is also directed to solenoid valve $MV_k$ opening the by-pass coupling and to relay $Rl_{10}$ through diode $D_{514}$.

Relay $Rl_{10}$ opens relay switch $r_k$, whereby the adjustable resistance $R_{52}$ is connected between rectifier $B_5$ and the various control circuit sections $ST_{51}$, $ST_{52}$ and $ST_{53}$. As a result, the respective down-shifting point for each control circuit section will be displaced to a lower speed than the respective up-shifting point.

In the shifting system shown in FIG. 5 as in the shifting systems discussed previously, voltage dividers $P_{51}$–$R_{53}$; $P_{52}$–$R_{55}$; and $P_{53}$–$R_{51}$ are arranged in the respective control circuit sections. The differential between the respective up-shifting and down-shifting points in each of the control circuit sections is determined by the values of resistors $R_{54}$, $R_{56}$ and $R_{58}$, $R_{59}$, $R_{60}$ and $R_{61}$, as well as the breakdown value of zener diodes $D_{51}$, $D_{52}$ and $D_{53}$. The thermistors $R_{62}$, $R_{63}$ and $R_{64}$ serve for temperature compensation. Although PNP transistors are used in the shifting systems shown in the preceding figures, the transistors shown in FIG. 5 are of the NPN type. In this case, the poles of rectifier $B_5$ as well as the terminals of diodes $D_{57}$, $D_{58}$, $D_{59}$ and $D_{54}$, $D_{55}$ and $D_{56}$ must be reversed in order to produce negative bias. The bases of the transistors will receive a negative cut-off voltage through diodes $D_{54}$, $D_{55}$ and $D_{56}$ which are connected between the respective emitter and the negative voltage line, and through the respective resistances $R_{56}$, $R_{66}$ and $R_{67}$.

In the first gear, when the vehicle speed reaches the point at which zener diode $D_{51}$ becomes conductive, the switching network $Sch_{51}$ is closed via the collector-emitter section of transistor $T_{51}$. Relay $Rl_{51}$ reverses switch $r_{512}$, disconnecting solenoid $MV_I$ and connecting solenoid $MV_{II}$, effecting a shift into second. At the same time, the reversal of switch $r_{512}$ also disconnects solenoid $MV_k$ and relay $Rl_{10}$. However, the charge on capacitor $C_{50}$ will delay the disconnection of solenoid valve $MV_k$ momentarily so that by-pass coupling to the torque converter will remain open during the shifting of gears. Deenergizing of relay $Rl_{10}$ will relax switch $r_k$, shunting resistor $R_{52}$ and effectively removing it from the control circuits.

By the foregoing description it can be readily seen that the switching system, according to this invention, can be easily adapted to various driving conditions and purposes.

As in FIG. 2, the switching system has been so designed as to be responsive not only to vehicle speed, but also to engine load or gas pedal setting and by a simple arrangement of a relay which makes use of the self-induced current caused by disconnecting the various solenoid valves to open the by-pass coupling of the torque converter momentarily during each shift of gears in the upward direction. In this case, energization of the solenoid valve connected with the by-pass coupling opens the by-pass.

In the switching system, according to FIG. 3, additional connections have been made which superimpose additional control of the up-shifting and down-shifting points in accordance with the various shifting steps.

The control circuit sections and switching networks of the switching system shown in FIG. 4 are similar to those in the preceding systems, yet allow for different adaptations to driving conditions. Rather than using variable controls depending upon engine load for adjustment of the control voltage values, a switching arrangement controlled by kick-down of the gas pedal is substituted. Also, by means of one additional control circuit section and switching network the switching system is arranged so that in the case of rapid deceleration of the vehicle, the by-pass coupling of the torque converter will remain open continuously.

Finally, the switching system, according to FIG. 5, is arranged so that the by-pass coupling of the torque converter will remain open throughout the range of the first gear and through the first gear change-over, but will be closed in the other gear ranges.

We claim:

1. In a vehicle having a multi-ratio transmission with a plurality of drive ratio establishing devices, a control system for automatically operating said devices comprising, means for generating a signal voltage varying in accordance with vehicle speed, a constant source of energizing current for actuating said drive ratio establishing devices, series connected switch means operatively connecting said source of energizing current to the devices for actuation thereof, a plurality of switch operating circuits respectively connected to said switch means for sequentially actuating said devices in response to variation in said signal voltage, and transformer means operatively coupling said generating means to each of said switch operating circuits for energization thereof at a predetermined signal voltage, each of said switch operating circuits having means for deenergization at a signal voltage different from said predetermined signal voltage.

2. A control system according to claim 1, wherein said transformer means includes a plurality of secondary windings respectively connected to said switch operating circuits, said windings being graduated in relation to one another to energize and deenergize the switch operating circuits at substantially the same signal voltages.

3. A control system according to claim 1, wherein said transformer means includes a single secondary winding, and a plurality of zener diodes with different breakdown voltage values respectively coupling said switch operating circuits to the secondary winding of the transformer means.

4. A control system according to claim 1, including means responsive to energization of each switch operating circuit for lowering the signal voltage supplied thereto by the transformer means.

5. A control system according to claim 1, wherein said transmission includes a hydrodynamic torque converter and a by-pass clutch solenoid means for activating said clutch during intervals when at least one of the switch operating circuits is energized, and means responsive to deenergization of said switch operating circuit for delaying de-actuation of the clutch.

6. A control system according to claim 5, including a voltage regulating means coupling the transformer means to the switch operating circuits, an adjustable resistance connected to the voltage regulating means for reducing the signal voltage, and means responsive to said deactuation of the by-pass clutch for shunting said adjustable resistance.

7. A control system according to claim 1, including a variable transformer coupling the generating means with the transformer means, said vehicle having an engine connected to the transmission and engine condition sensing means operatively connected to the variable transformer for varying the voltage ratio thereof.

8. A control system according to claim 1, wherein said vehicle includes an engine control, and kick-down means actuated by the engine control for reducing the voltage supplied by the generating means to the transformer means.

References Cited
UNITED STATES PATENTS

| | | | |
|---|---|---|---|
| 2,891,411 | 6/1959 | Sutherland et al. | 74—472.3 X |
| 2,907,423 | 10/1959 | Jaeschke | 192—3.5 |
| 3,088,337 | 5/1963 | Bemmann et al. | 74—752 |
| 3,165,940 | 1/1965 | Grau | 74—472.3 X |
| 3,203,518 | 8/1965 | Peras | 192—3.5 X |

MARK M. NEWMAN, *Primary Examiner.*

BENJAMIN W. WYCHE III, *Examiner.*